United States Patent
Glatzmaier

(10) Patent No.: US 7,446,582 B2
(45) Date of Patent: Nov. 4, 2008

(54) PHASE ANGLE CONTROL METHOD

(76) Inventor: Greg C Glatzmaier, 4311 Valli Vista, Colorado Springs, CO (US) 80915

( * ) Notice: Subject to any disclaimer, the term of this patent is extended or adjusted under 35 U.S.C. 154(b) by 894 days.

(21) Appl. No.: 10/993,091

(22) Filed: Nov. 18, 2004

(65) Prior Publication Data

US 2005/0110547 A1  May 26, 2005

Related U.S. Application Data

(60) Provisional application No. 60/524,203, filed on Nov. 21, 2003.

(51) Int. Cl.
*H03H 11/16* (2006.01)
(52) U.S. Cl. .................... 327/233; 327/231
(58) Field of Classification Search ............. None
See application file for complete search history.

(56) References Cited

U.S. PATENT DOCUMENTS

| | | | |
|---|---|---|---|
| 2,525,265 A | 10/1950 | Moineau |
| 3,567,348 A | 3/1971 | Benson |
| 3,728,049 A | 4/1973 | Miller, Jr. |
| 4,187,721 A | 2/1980 | Smith |
| 4,237,704 A | 12/1980 | Varadan |
| 4,422,338 A | 12/1983 | Smith |
| 4,491,025 A | 1/1985 | Smith et al. |
| 4,923,376 A | 5/1990 | Wright |
| 4,944,748 A | 7/1990 | Bramm et al. |
| 4,950,135 A | 8/1990 | Tojo et al. |
| 5,125,805 A | 6/1992 | Fujiwara et al. |
| 5,193,391 A | 3/1993 | Cage |
| 5,255,521 A | 10/1993 | Watanabe |
| 5,266,012 A | 11/1993 | Hashimoto et al. |
| 5,466,134 A | 11/1995 | Shaffer et al. |
| 5,553,742 A | 9/1996 | Maruyama et al. |
| 5,704,771 A | 1/1998 | Fujisawa et al. |
| 5,920,133 A | 7/1999 | Penswick et al. |
| 6,361,292 B1 | 3/2002 | Chang et al. |
| 6,694,287 B2* | 2/2004 | Mir et al. ............ 702/183 |
| 7,064,513 B2* | 6/2006 | Fenley ............... 318/700 |

FOREIGN PATENT DOCUMENTS

WO    WO 03/058068    7/2003

* cited by examiner

*Primary Examiner*—Cassandra Cox
(74) *Attorney, Agent, or Firm*—Swanson & Bratschun, L.L.C.

(57) ABSTRACT

A method of phase angle control including the steps of generating a first periodic function having a first amplitude and generating a second periodic function having a second amplitude, which second periodic function is phase shifted relative to the first periodic function by a first phase angle. The method further includes generating a first positive feedback periodic function and generating a second positive feedback periodic function which is phase shifted relative to the first positive feedback periodic function by a second phase angle. In addition, the method includes generating a first control function, a first weighting function, a second weighting function, and linearly combining the product of the first positive feedback periodic function and the first weighting function with the product of the second positive feedback periodic function and the second weighting function to generate a second control function. The method further includes applying the first control function and the second control function to the first and second periodic functions to maintain the first and second amplitudes and maintain the first phase angle.

24 Claims, 3 Drawing Sheets

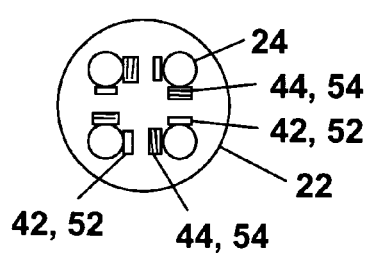
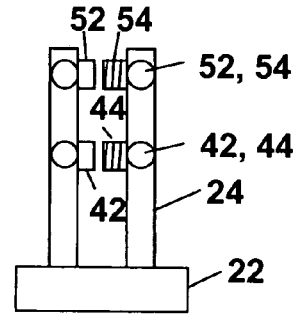
FIG. 6A  FIG. 6B
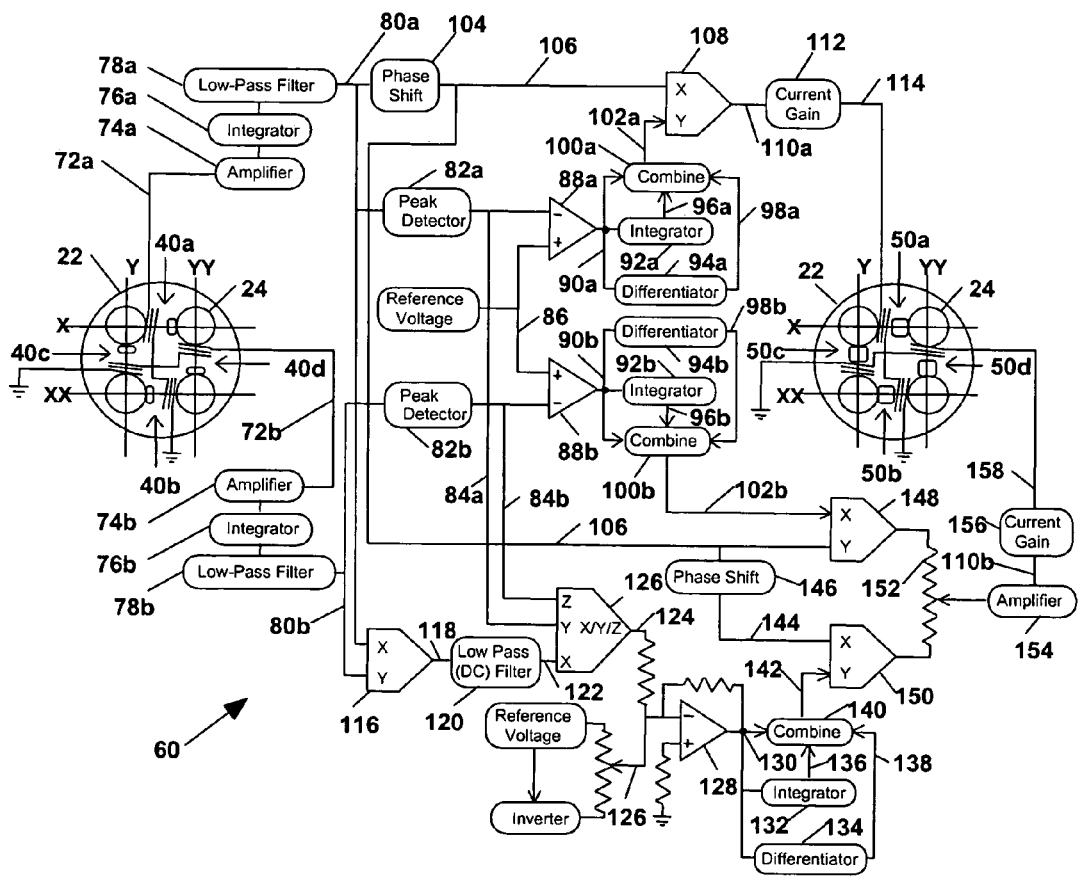
FIG. 7

PHASE ANGLE CONTROL METHOD

RELATED APPLICATION DATA

This application claims priority to U.S. Provisional Application Ser. No. 60/524,203, filed Nov. 21, 2003, entitled PHASE CONTROL ANGLE METHOD, which application is incorporated by reference herein in its entirety.

TECHNICAL FIELD

The present invention is a phase angle control method, and more particularly a phase angle control method, that establishes and maintains the phase angle between two periodic functions at 90° or other desirable angles.

BACKGROUND ART

Many classes of mechanical devices require the generation and maintenance of orbital motion. Pumps and compressors are one class of device where operation of an apparatus often requires that one or more components be moved in an orbital fashion.

For example, common scroll pumps and compressors consist of a cylindrical chamber which encloses a pair or interlinked scrolls. One scroll is fixed to the chamber wall. The second is mounted, typically by a mechanical linkage, to a rotating power shaft. The shaft and linkage impart orbital motion to the second shaft. The mechanical linkages which impart orbital motion in a conventional scroll pump design must extend into the fluid pumping chamber, however. Therefore, complicated seals which can develop leaks over time are an inherent shortcoming of this type of conventional design.

A fully sealed, novel pump design which also relies upon the generation of orbital motion to pump fluid is disclosed in International Patent Application Serial Number PCT/US03/00185 (WO 03/058068), filed Jan. 3, 2003, entitled ORBITAL FLUID PUMP, which application is incorporated herein by reference in its entirety. The pump of the WO 03/058068 application features an electromagnetic drive attached to outside portions of the fluid pumping chamber, so the need for seals which might be subject to failure is eliminated. An electromagnetic drive such as is disclosed in the WO 03/058068 application relies upon the application of periodic forces which are offset in time. These periodic forces may be described as periodic functions separated by a phase angle.

The periodic forces or functions may be generated by a circuit which uses an oscillator to generate the forces or functions at a preset frequency and phase angle. Enhanced efficiency and performance can be obtained if the periodic forces or functions are applied to the mechanical device with appropriate feedback from the device as to maintain the natural or desired frequency and phase angle. A need exists for a method to compensate for variations in the properties of the device which may lead to changes in the required frequency or phase angle of the periodic forces or functions. A conventional control circuit based upon an oscillator with no feedback will not automatically compensate for these variations in the properties of the mechanical components of the device. Thus, it is possible for an oscillator based circuit to generate forces or functions contrary to the resonant frequency and desired phase angle of the device, resulting in inefficiency or failure.

SUMMARY OF THE INVENTION

The present invention comprises a method of phase angle control including the steps of generating a first periodic function having a first amplitude and generating a second periodic function having a second amplitude, which second periodic function is phase shifted relative to the first periodic function by a first phase angle. The method further includes generating a first positive feedback periodic function and generating a second positive feedback periodic function which is phase shifted relative to the first positive feedback periodic function by a second phase angle. In addition, the method includes generating a first control function, a first weighting function, a second weighting function, and linearly combining the product of the first positive feedback periodic function and the first weighting function with the product of the second positive feedback periodic function and the second weighting function to generate a second control function. The method further includes applying the first control function and the second control function to the first and second periodic functions to maintain the first and second amplitudes and maintain the first phase angle.

The first control function, the second control function, or the first weighting function may be related to at least one of the first and second amplitudes. In addition, the method may include generating the second weighting function by measuring the first phase angle, generating a phase angle function which is related to the first phase angle, and generating an error function from the phase angle function. In addition, the error function may be integrated and differentiated with respect to time to generate integrated and differentiated error functions, and the error function, the integrated error function, and the differentiated error function may be linearly combined to generate the second weighting function.

Generation of a phase angle function may include multiplying the first and second periodic functions to generate a product function and filtering the product function to generate a filtered function. In addition, compensation may be applied for the first and second amplitudes. The first and second amplitudes may be compensated for by measuring at least one of the amplitudes and dividing any measured amplitude into any one or any combination of the first periodic function, the second periodic function, the product function, or the filtered function.

The error function may be generated by linearly combining the phase angle function and a reference function to generate a referenced phase angle function and inverting the referenced phase angle function. The first and second control functions may be applied by amplifying or otherwise increasing the voltage and current of the control functions and generating or maintaining at least one of the first or second periodic functions from the first and second control functions.

BRIEF DESCRIPTION OF THE DRAWINGS

FIG. 6A is a top plan view of the apparatus of FIG. 2 showing an attachment orientation of the velocity sensors and electromagnetic drives of FIG. 4 and FIG. 5;

FIG. 6B is a side plan view of the apparatus of FIG. 6A; and

FIG. 7 is a schematic diagram of a circuit suitable for implementation of the present invention.

DETAILED DESCRIPTION OF THE PREFERRED EMBODIMENT

Figure 1:
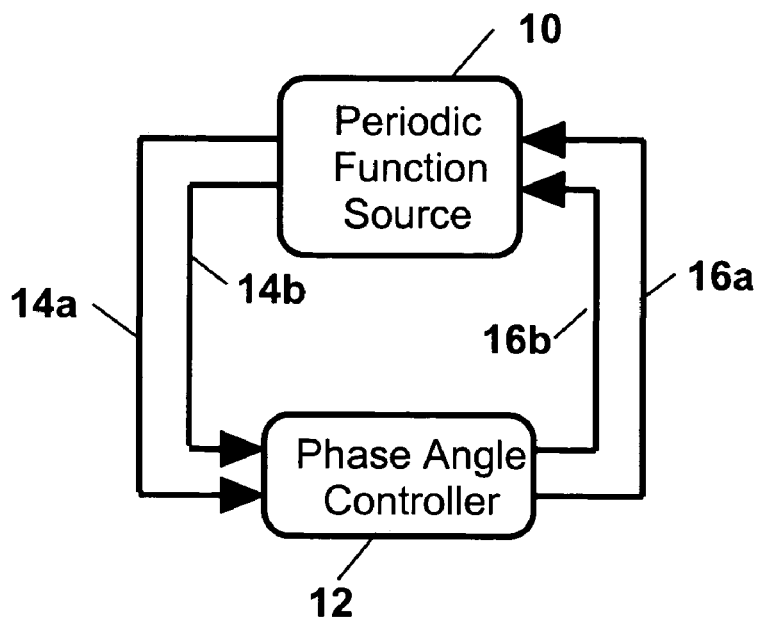
FIG. 1 is a schematic diagram of a periodic function source and the phase angle controller in accordance with the present invention.

The present invention is a phase angle control method that generates or maintains the phase angle between two periodic functions at 90° or other angles. Specifically, the present invention consists of an electrical or mechanical apparatus for establishing and maintaining a desired phase angle between two periodic functions. FIG. 1 schematically presents periodic function source 10 and phase angle controller 12. Periodic function source 10 and phase angle controller 12 function together to establish and maintain periodic functions 14a, 14b which are input functions to phase angle controller 12. Phase angle controller 12 uses periodic functions 14a, 14b to generate control functions 16a, 16b which provide feedback to periodic function source 10 to establish and maintain periodic functions 14a, 14b and the phase angle between them.

Figure 2:
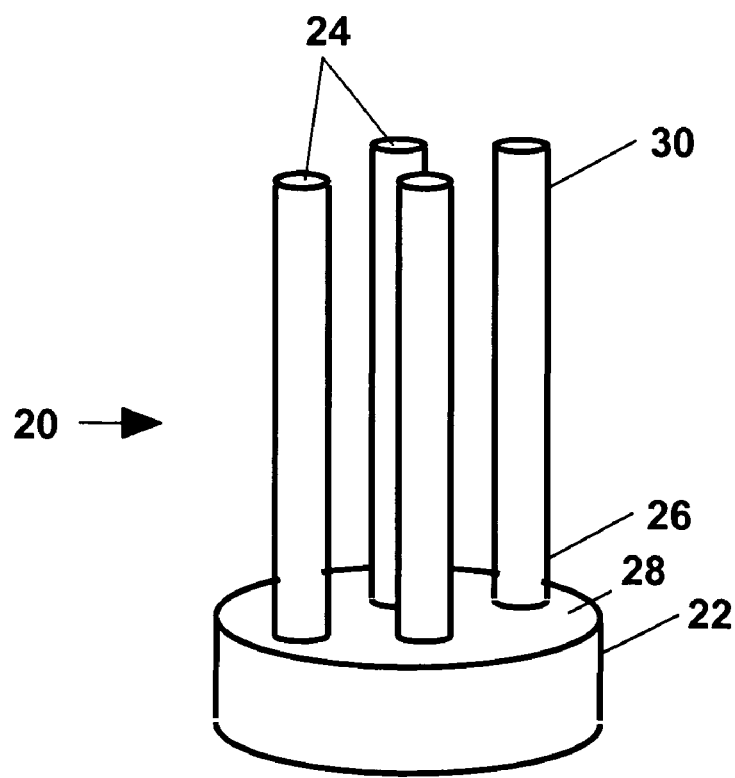
FIG. 2 is a perspective view of an apparatus upon which the present invention may be implemented.

The method of the present invention may be applied to an apparatus for establishing and maintaining orbital motion in which the shape of the orbital motion is determined by the phase angle between two periodic vibrations. A suitable orbital motion apparatus can be any device which allows vibrations to occur in two planes which are perpendicular to each other. An example of such an apparatus is shown in FIG. 2. Apparatus 20 consists of a base 22 and four tines 24. Each tine 24 has a fixed end 26 that mounts to the base 22 on a common face 28. The opposite ("free") end 30 of each tine 24 is free to vibrate within any plane which contains the lengthwise axis of tine 24.

Each of the four tines 24 may be made to vibrate in two modes, which are perpendicular to each other in space. These two vibrational modes can occur as a result of periodic forces which are applied to deflect the free ends 30 about their respective fixed ends 26. The vibrations are periodic in nature and occur at the resonant or natural frequency of tines 24. This frequency is related to the tine's 24 stiffness and bending moment.

Figure 3:
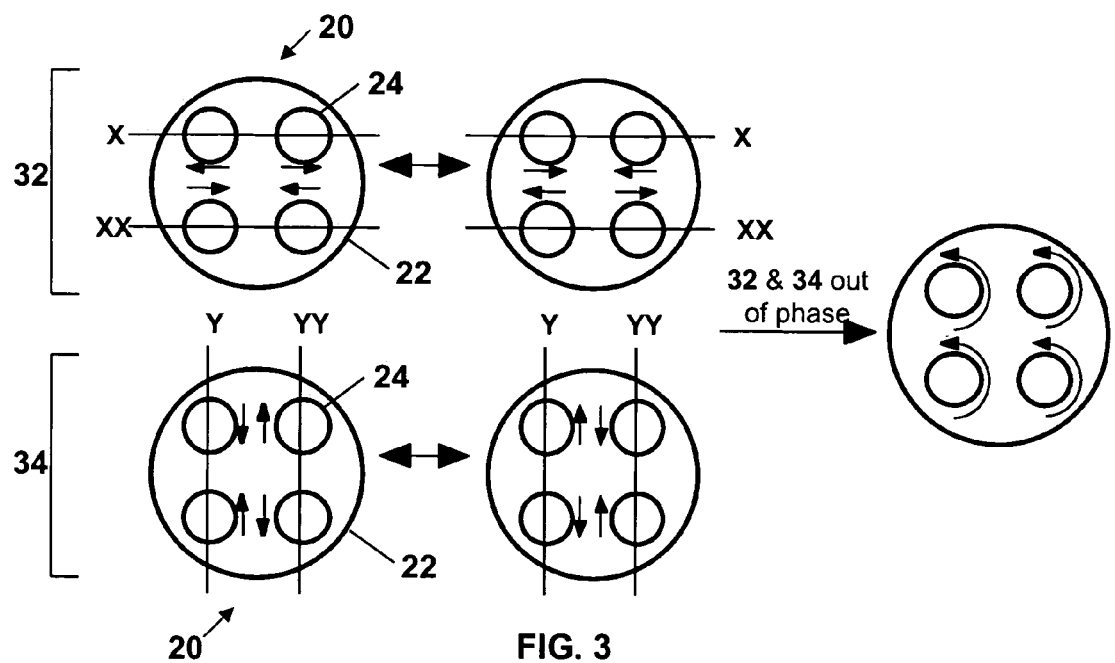
FIG. 3 is a schematic diagram of the apparatus of FIG. 2 showing vibrational modes.

Further understanding of the vibrations described above can be obtained from FIG. 3. Vibration modes 32, 34 are presented separately. For each mode 32, 34, two top views of the apparatus 20 are shown including base 22 and the four tines 24. As seen in FIG. 3, vibration mode 32 consists of deflections of free ends 30 of the tines 24 along lines X and XX. Vibrations are such that while free ends 30 of the two tines 24 positioned along line X are moving toward each other, free ends 30 of the two tines 24 positioned along line XX are moving away from each other and vise versa. Vibration mode 32 is characterized by requiring that the deflections of free ends 30 of the tines 24 along line X and those along line XX are always phase shifted by 180° with respect to each other. The nature of vibration mode 34 is analogous to mode 32. In the mode 34 case, the vibrations are along lines Y and YY, as shown in FIG. 3. Thus, vibrations of each mode 32, 34 occur between pairs of members, as in the design of a tuning fork.

When vibration modes 32, 34 are phase-shifted in time, the motion of free ends 30 of tines 24 is orbital in nature. A phase angle of 90° between the two vibrations results in a motion that is circular. Other phase angles result in orbits which are elliptical in shape. Phase angles from 0° to 90° will produce motion that varies from a highly eccentric ellipse (~0°) to purely circular (90°).

Figure 4:
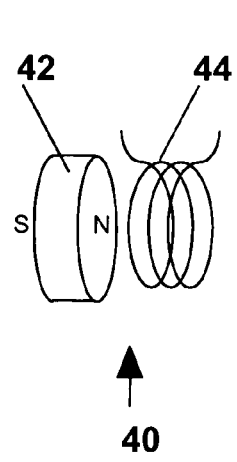
FIG. 4 is a schematic diagram of a velocity sensor suitable for implementation of the present invention.

Various types of velocity sensors, electromagnetic drives or other active drives, and control circuitry, each as described or in detail below, can be used to generate vibrations and resultant orbital motion as described above. A velocity sensor 40 as shown in FIG. 4 may consist of magnet 42 and solenoid 44. Magnet 42 may be mounted to the free end 30 of a tine 24 and solenoid 44 may be mounted to the free end 30 of an adjacent tine 24. Velocity sensor components 42, 44 are mounted in line with each other and along a line of relative motion between the two tines 24.

Figure 5:
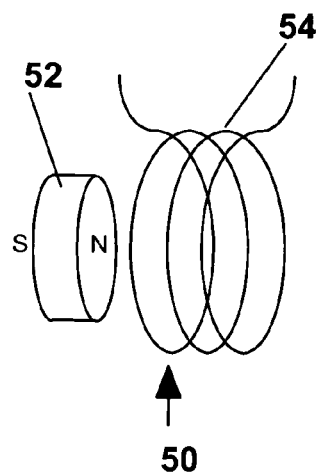
FIG. 5 is a schematic diagram of an electromagnetic drive suitable for implementation of the present invention.

An electromagnetic drive 50 as shown in FIG. 5 may consist of magnet 52 and solenoid 54. One possible set of locations for the sensor 40 and drive 50 components on the four tines 24 of the apparatus of FIG. 2 is shown in FIG. 6. It is important to note that the apparatus of FIGS. 2-6 is used herein to illustrate the method of the present invention, however, the invention can be applied to any other suitable apparatus having components moving orbitally, or for other applications which require a desired phase angle between the two functions.

In use, velocity sensor 40 generates a voltage that is proportional to the rate of change of magnetic flux within the enclosed area of the turns of solenoid 44. If the variation of magnetic flux with distance from magnet 42 along its axis is approximately linear (within the range of movement of solenoid 44), then the induced voltage across solenoid 44 will be proportional to the relative velocity between magnet 42 and solenoid 44. This induced voltage is used as a measure of the relative velocity between the free ends 30 of two tines 24, one associated with magnet 42 and the other associated with solenoid 44.

The components of the electromagnetic drive 50, magnet 52, and solenoid 54 may also be mounted to free ends 30 of adjacent tines 24 in a manner analogous to velocity sensor 40 components 42, 44. The orientation of magnet 52 and solenoid 54 is such that the magnetic flux lines from the magnet intersect the solenoid 54 turns such that a large component of the magnetic flux is perpendicular to both the tangent of the solenoid 54 turns and the line of relative motion between magnet 52 and solenoid 54. This results in a force generated along the line of relative motion upon application of current to the solenoid 54. The magnitude of this force varies with the magnitude of the current through solenoid 54, providing a time-varying force which can maintain the desired vibration.

A circuit 60 as shown in FIG. 7 may be used to drive and control the components described above. A combination of signals from multiple velocity sensors 40a, 40b can be used to measure the relative velocities resulting from vibrations along lines X, XX. Sensors 40a, 40b are configured such that they will not produce a signal from tine vibrations along lines Y or YY. A combination of signals from other velocity sensors 40c, 40d may be used to measure the relative velocities resulting from vibrations along lines Y, YY. Sensors 40c, 40d are configured such that they will not produce a signal from tine vibrations along line X or XX. Both sensor pairs 40a, 40b and 40c, 40d generate velocity signals which are proportional only to the velocities generated by their corresponding vibrational mode.

All of the functions described herein consist of voltage signals for this preferred embodiment. For other embodiments, these functions may consist of current signals or any other suitable signal media. Velocity functions 72a, 72b from sensor pairs 40a, 40b and 40c, 40d are amplified, integrated and filtered using amplifiers 74a, 74b, integrators 76a, 76b, and filters 78a, 78b to create periodic functions 80a, 80b as shown in FIG. 7. The order in which functions 72a, 72b are combined, amplified, integrated and filtered can be varied. Peak detectors 82a, 82b measure amplitudes 84a, 84b of periodic functions 80a, 80b. Amplitudes 84a, 84b are compared to a reference voltage 86 using instrumental amplifiers 88a, 88b to produce error functions 90a, 90b which are proportional to the difference of the two inputs. Error functions 90a, 90b are integrated in time using integrators 92a, 92b and differentiated in time using differentiators 94a, 94b. Integrated error functions 96a, 96b, differentiating error functions 98a, 98b and error functions 90a, 90b are linearly combined using a junction 100a, 100b to create amplitude control functions 102a, 102b for vibration modes 32, 34. Amplitude control function 102b is also known as the first weighting function.

Periodic function 80a is phase shifted using phase shifter 104 to compensate for phase shifts due to the inherent behavior of certain circuit components and also to compensate for induction, which is a characteristic of drive solenoid 54. The resulting first positive feedback function 106 is fed to multiplier 108 along with amplitude control function 102a. The product is first control function 110a. This function is provided with current gain, using current amplifier 112, to generate drive function 114 which provides time-varying current to drives 50a, 50b having the amplitude, frequency, and phase so as to maintain first periodic function 80a and first vibration mode 32 along lines X and XX.

The phase angle between periodic functions 80a, 80b is measured by multiplying periodic functions 80a, 80b using multiplier 116. Product function 118 is passed through low-pass filter 120 which only passes frequencies that are substantially lower than the representative frequency of the two vibrations but are high enough to transfer transient variations in the phase angle between the two periodic functions 80a, 80b. Filtered function 122 is calibrated by dividing it by amplitudes 84a, 84b to produce phase angle function 124 using divider 126. Phase angle function 124 provides a measure of phase angle between periodic functions 80a, 80b and is used for feedback control. It is combined with reference value 126 and then inverted and amplified using inverting amplifier 128 to produce error signal 130. For phase angle control to 90°, reference value 126 is set substantially to 0. For phase angle control other than 90°, reference value 126 is set to the negative value of phase angle function 124 which corresponds to the desired phase angle.

Error function 130 is integrated in time using integrator 132 and differentiating in time using differentiator 134. Error function 130, integrated error function 136 and differentiated error function 138 are linearly combined using junction 140 to generate the second weighting function 142. A second positive feedback function 144 is generated by phase shifting first positive feedback function 106 using phase shifter 146 by any suitable angle. The first and second weighting functions 102b, 142 are weighting factors for the first and second positive feedback functions 106, 144. Either weighting function 102b, 142 can be used with either positive feedback function 106, 144.

A second control function 100b is generated by linearly combining the product of the first weighting function 102b and first positive feedback function 106 with the product of second weighting function 142 and second positive feedback function 144. This operation is accomplished using multipliers 148, 150, potentiometer 152, and amplifier 154. Second control function 110b is provided with current gain using current amplifier 156 to generate drive function 158. Drive function 158 provides a time-varying current to drives 50c, 50d having an amplitude and frequency so as to maintain second periodic function 80b and second vibration mode 34 along lines Y, YY. Drive function 158 also maintains the desired phase angle between periodic functions 80a, 80b and between vibration modes 32, 34.

Velocity sensing, signal generation, and signal control by the circuit 60 is based entirely on feedback control principles. Circuit 60 does not use a drive oscillator to generate the vibrations at a preset frequency. The result is a resonating system that always operates at the natural vibrational frequency of the tines 24. As the natural frequency of tines 24 changes due to use, varying temperature or other factors, circuit 60 adjusts to provide drive functions 114, 158 at the same changing frequency. The result is a very stable controller which always operates at its most efficient frequency.

The description of the present invention has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiment described and shown in the figures was chosen and described in order to best explain the principles of the invention, the practical application, and to enable others of ordinary skill in the art to understand the invention for various embodiments with various modifications as are suited to the particular use contemplated.

What is claimed is:

1. A phase angle control method comprising:
   a. generating a first periodic function having a first amplitude;
   b. generating a second periodic function having a second amplitude and which is phase-shifted relative to the first periodic function by a first phase angle;
   c. generating a first positive feedback periodic function;
   d. generating a second positive feedback periodic function which is phase-shifted relative to the first positive feedback periodic function by a second phase angle;
   e. generating a first control function;
   f. generating a first weighting function;
   g. generating a second weighting function;
   h. linearly combining the product of the first positive feedback periodic function and the first weighting function with the product of the second positive feedback periodic function and the second weighting function to generate a second control function; and
   i. applying the first control function and the second control function to the first and second periodic functions to maintain the first and second amplitudes and to maintain the first phase angle.

2. The method of claim 1 wherein the first periodic function and the second periodic function are generated mechanically.

3. The phase angle control method of claim 1 wherein the first control function is related to at least one of the first and second amplitudes.

4. The phase angle control method of claim 1 wherein the second control function is related to at least one of the first and second amplitudes.

5. The phase angle control method of claim 1 wherein the first weighting function is related to at least one of the first and second amplitudes.

6. The phase angle control method of claim 1 wherein generating the second weighting function comprises:
   a. measuring the first phase angle;
   b. generating a phase angle function which is related to the first phase angle; and
   c. generating an error function from the phase angle function.

7. The phase angle control method of claim 6 wherein generating a phase angle function comprises:
   a. multiplying the first and second periodic functions to generate a product function;
   b. filtering the product function to generate a filtered function; and
   c. compensating for the first and second amplitudes.

8. The phase angle control method of claim 7 wherein filtering the product function comprises passing frequencies which are in a range substantially less than the frequency of the first and second periodic functions yet great enough to communicate transient changes of the phase angle between the first and second periodic functions.

9. The phase angle control method of claim 7 wherein compensating for the first and second amplitudes comprises;
   a. measuring at least one the first and second amplitudes; and
   b. dividing any measured amplitude into at least one of the first periodic function, the second periodic function, the product function, and the filtered function.

10. The phase angle control method of claim 6 wherein generating the error function comprises:
    a. linearly combining the phase angle function and a reference function to generate a referenced phase angle function; and
    b. inverting the referenced phase angle function.

11. The phase angle control method of claim 1 wherein applying the first and second control functions comprises:
    a. amplifying the voltage of the first control function and the second control function; and
    b. generating at least one of the first and second periodic functions from the first and second control functions.

12. The phase angle control method of claim 1 wherein applying the first and second control functions comprises:
    a. increasing the current of the first control function and the second control function; and
    b. generating at least one of the first and second periodic functions from the first and second control functions.

13. An apparatus for controlling a first phase angle between a first periodic function and a second periodic function comprising:
    a. means for generating a first positive feedback periodic function;
    b. means for generating a second positive feedback periodic function which is phase-shifted relative to the first positive feedback periodic function by a second phase angle;
    c. means for generating a first control function;
    d. means for generating a first weighting function;
    e. means for generating a second weighting function;
    f. means for linearly combining the product of the first positive feedback periodic function and the first weighting function with the product of the second positive feedback periodic function and the second weighting function to generate a second control function; and
    g. means for applying the first control function and the second control function to the first and second periodic functions to maintain a first amplitude associated with the first periodic function and to maintain a second amplitude associated with the second periodic function and to maintain the first phase angle.

14. The apparatus of claim 13 wherein the first periodic function and the second periodic function are mechanically generated.

15. The apparatus for controlling a first phase angle of claim 13 wherein the first control function is related to at least one of the first and second amplitudes.

16. The phase angle control method of claim 13 wherein the second control function is related to at least one of the first and second amplitudes.

17. The apparatus for controlling a first phase angle of claim 13 wherein the first weighting function is related to at least one of the first and second amplitudes.

18. The apparatus for controlling a first phase angle of claim 13 wherein the means for generating the second weighting function comprises:
    a. means for measuring the first phase angle;
    b. means for generating a phase angle function which is related to the first phase angle; and
    c. means for generating an error function from the phase angle function.

19. The apparatus for controlling a first phase angle of claim 18 wherein the means for generating a phase angle function comprises:
    a. a multiplier for multiplying the first and second periodic functions to generate a product function;
    b. a filter for filtering the product function to generate a filtered function; and
    c. means for compensating for the first and second amplitudes.

20. The apparatus for controlling a first phase angle of claim 19 wherein the filter passes frequencies which are in a range substantially less than the frequency of the first and second periodic functions yet great enough to communicate transient changes of the phase angle between the first and second periodic functions.

21. The apparatus for controlling a first phase angle of claim 19 wherein the means for compensating for the first and second amplitudes comprises:
    a. means for measuring at least one the first and second amplitudes; and
    b. a divider for dividing any measured amplitude into at least one of the first periodic function, the second periodic function, the product function, and the filtered function.

22. The apparatus for controlling a first phase angle of claim 18 wherein the means for generating the error function comprises:
    a. means for linearly combining the phase angle function and a reference function to generate a referenced phase angle function; and
    b. an inverter for inverting the referenced phase angle function.

23. The apparatus for controlling a first phase angle of claim 13 wherein the means for applying the first and second control functions comprises:
    a. a voltage amplifier for amplifying the first control function and the second control function; and
    b. means for generating at least one of the first and second periodic functions from the first and second control functions.

24. The apparatus for controlling a first phase angle of claim 13 wherein the means for applying the first and second control functions comprises:
    a. a current amplifier for increasing the current of the first control function and the second control function; and
    b. means for generating at least one of the first and second periodic functions from the first and second control functions.

* * * * *